United States Patent
Pennala et al.

(10) Patent No.: US 10,137,874 B2
(45) Date of Patent: Nov. 27, 2018

(54) BRAKE PEDAL EMULATOR OF A BRAKE-BY-WIRE SYSTEM AND METHOD OF OPERATION

(71) Applicant: GM GLOBAL TECHNOLOGY OPERATIONS LLC, Detroit, MI (US)

(72) Inventors: Brandon C. Pennala, Howell, MI (US); Scott C. Mrdeza, Lennon, MI (US); Michael C. Roberts, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/230,868

(22) Filed: Aug. 8, 2016

(65) Prior Publication Data

US 2018/0037202 A1 Feb. 8, 2018

(51) Int. Cl.
| | |
|---|---|
| *B60T 8/34* | (2006.01) |
| *B60T 8/40* | (2006.01) |
| *B60T 7/04* | (2006.01) |
| *B60T 8/32* | (2006.01) |
| *B60T 11/18* | (2006.01) |

(52) U.S. Cl.
CPC .............. *B60T 8/409* (2013.01); *B60T 7/042* (2013.01); *B60T 8/3255* (2013.01); *B60T 11/18* (2013.01); *B60T 2270/82* (2013.01)

(58) Field of Classification Search
CPC ........ B60T 8/409; B60T 7/042; B60T 8/3255; B60T 11/18; B60T 2270/82; G05G 1/30
USPC ........ 303/113.4, 20, 113.1, 115.2, 152, 155, 303/50; 60/545, 550, 554; 701/70, 76, 701/83; 74/514, 560
See application file for complete search history.

(56) References Cited

U.S. PATENT DOCUMENTS

| | | | | |
|---|---|---|---|---|
| 1,520,347 | A * | 12/1924 | Hofmann | B60G 11/34 267/238 |
| 6,105,737 | A * | 8/2000 | Weigert | B60T 7/042 188/156 |
| 6,367,886 | B1 * | 4/2002 | Shaw | B60T 7/042 188/151 A |
| 7,425,042 | B2 * | 9/2008 | Fujiwara | B60T 7/042 303/114.1 |
| 8,757,734 | B2 * | 6/2014 | Toyohira | B60T 7/042 303/113.4 |
| 2001/0043009 | A1 * | 11/2001 | Anderson | B60T 7/042 303/3 |
| 2002/0074196 | A1 * | 6/2002 | Park, II | F16D 57/002 188/267.2 |
| 2002/0108463 | A1 * | 8/2002 | Shaw | G05G 1/30 74/512 |
| 2005/0046273 | A1 * | 3/2005 | Jung | B60T 7/042 303/113.4 |

(Continued)

*Primary Examiner* — Pamela Rodriguez
(74) *Attorney, Agent, or Firm* — Canton Colburn LLP

(57) ABSTRACT

A brake pedal emulator for a brake-by-wire system of a vehicle extends and connects between a support structure and a brake pedal operatively engaged to the support structure. The brake pedal emulator includes a hydraulic cylinder having a magneto-rheological hydraulic fluid and an electrical element configured to carry an electrical current for controlling a viscosity of the magneto-rheological hydraulic fluid and thereby controlling a first force exerted by the hydraulic cylinder when actuated by the brake pedal.

4 Claims, 4 Drawing Sheets

(56) References Cited

U.S. PATENT DOCUMENTS

2011/0254358 A1* 10/2011 Strengert .................. B60T 1/10
                                                                             303/3

* cited by examiner

BRAKE PEDAL EMULATOR OF A BRAKE-BY-WIRE SYSTEM AND METHOD OF OPERATION

FIELD OF THE INVENTION

The subject invention relates to a brake-by-wire (BBW) system, and more particularly, to a brake pedal emulator of the BBW system and method of operation.

BACKGROUND

Traditional service braking systems of a vehicle are typically hydraulic fluid based systems actuated by a driver depressing a brake pedal that generally actuates a master cylinder. In-turn, the master cylinder pressurizes hydraulic fluid in a series of hydraulic fluid lines routed to respective actuators at brakes located adjacent to each wheel of the vehicle. Such hydraulic braking may be supplemented by a hydraulic modulator assembly that facilitates anti-lock braking, traction control, and vehicle stability augmentation features. The wheel brakes may be primarily operated by the manually actuated master cylinder with supplemental actuation pressure gradients supplied by the hydraulic modulator assembly during anti-lock, traction control, and stability enhancement modes of operation.

When a plunger of the master cylinder is depressed by the brake pedal to actuate the wheel brakes, pedal resistance is encountered by the driver. This resistance may be due to a combination of actual braking forces at the wheels, hydraulic fluid pressure, mechanical resistance within the booster/master cylinder, the force of a return spring acting on the brake pedal, and other factors. Consequently, a driver is accustomed to and expects to feel this resistance as a normal occurrence during operation of the vehicle. Unfortunately, the 'feel' of conventional brake pedals are not adjustable to meet the desires of a driver.

More recent advancements in braking systems include BBW systems that actuate the vehicle brakes via an electric signal typically generated by an on-board controller. Brake torque may be applied to the wheel brakes without a direct hydraulic link to the brake pedal. The BBW system may be an add-on, (i.e., and/or replace a portion of the more conventional hydraulic brake systems), or may completely replace the hydraulic brake system (i.e., a pure BBW system). In either type of BBW system, the brake pedal 'feel', which a driver is accustomed to, must be emulated.

Accordingly, it is desirable to provide a brake pedal emulator that may be adjustable and may simulate the brake pedal 'feel' of more conventional brake systems.

SUMMARY OF THE INVENTION

In one exemplary embodiment of the invention, a brake pedal emulator extends and connects between a support structure and a brake pedal operatively engaged to the support structure. The brake pedal emulator includes a hydraulic cylinder having a magneto-rheological hydraulic fluid and an electrical element configured to carry an electrical current for controlling a viscosity of the magneto-rheological hydraulic fluid. By controlling the viscosity of the hydraulic fluid, a force exerted by the hydraulic cylinder against the brake pedal when actuated may be controlled.

In another exemplary embodiment of the invention, a BBW system for a vehicle includes a brake pedal operatively engaged to a support structure, and a brake pedal emulator. The brake pedal emulator is constructed and arranged to exert a damping force upon the brake pedal, and includes a hydraulic cylinder having an electric coil and a hydraulic fluid configured to change viscosity when the electric coil is energized.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
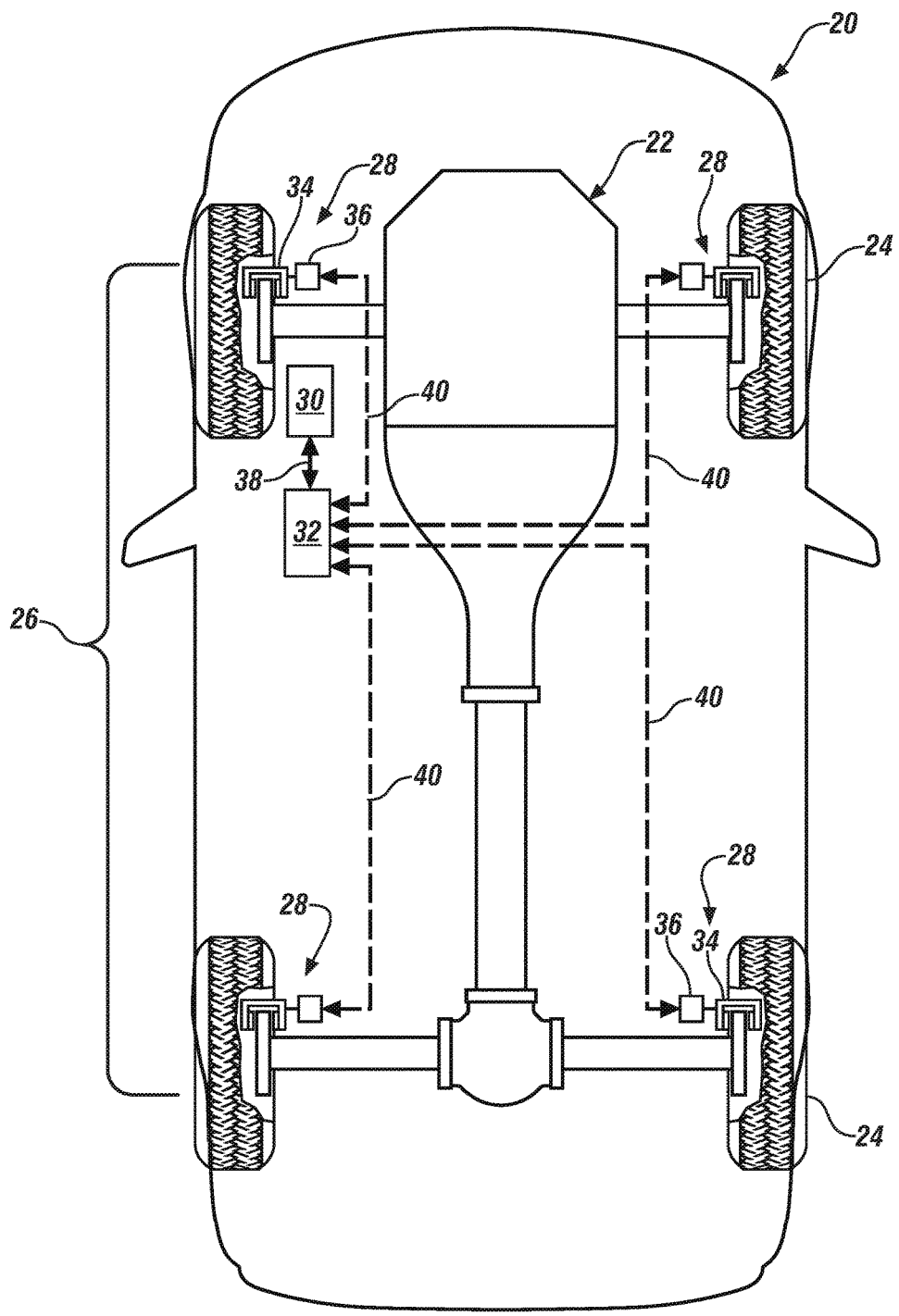
FIG. 1 is a schematic plan view of a vehicle having a BBW system as one non-limiting example in accordance with the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention, FIG. 1 is a schematic of a vehicle 20 that may include a powertrain 22 (i.e., an engine, transmission and differential), a plurality of rotating wheels 24 (i.e., four illustrated), and a BBW system 26 that may include a brake assembly 28 for each respective wheel 24, a brake pedal assembly 30, and a controller 32. The powertrain 22 is adapted to drive at least one of the wheels 24 thereby propelling the vehicle 20 upon a surface (e.g., road). The BBW system 26 is configured to generally slow the speed and/or stop motion of the vehicle 20. The vehicle 20 may be an automobile, truck, van, sport utility vehicle, or any other self-propelled or towed conveyance suitable for transporting a burden.

Each brake assembly 28 of the BBW system 26 may include a brake 34 and an actuator 36 configured to operate the brake. The brake 34 may include a caliper and may be any type of brake including disc brakes, drum brakes, and others. As non-limiting examples, the actuator 36 may be an electro-hydraulic brake actuator (EHBA) or other actuator capable of actuating the brake 34 based on an electrical input signal that may be received from the controller 32. More specifically, the actuator 36 may be or include any type of motor capable of acting upon a received electric signal and as a consequence converting energy into motion that controls movement of the brake 34. Thus, the actuator 36 may be a direct current motor configured to generate electro-hydraulic pressure delivered to, for example, the calipers of the brake 34.

The controller 32 may include a computer-based processor (e.g., microprocessor) and a computer readable and writeable storage medium. In operation, the controller 32 may receive one or more electrical signals from the brake pedal assembly 30 over a pathway (see arrow 38) indicative of driver braking intent. In-turn, the controller 32 may process such signals, and based at least in-part on those signals, output an electrical command signal to the actuators 36 over a pathway (see arrow 40). Based on any variety of vehicle conditions, the command signals directed to each wheel 24 may be the same or may be distinct signals for each wheel 24. The pathways 38, 40 may be wired pathways, wireless pathways, or a combination of both. Non-limiting examples of the controller 32 may include an arithmetic logic unit that performs arithmetic and logical operations; an electronic control unit that extracts, decodes, and executes instructions from a memory; and, an array unit that utilizes multiple parallel computing elements. Other examples of the controller 32 may include an engine control module, and an application specific integrated circuit. It is further contemplated and understood that the controller 32 may include redundant controllers, and/or the system may include other redundancies, to improve reliability of the BBW system 26.

Figure 2:
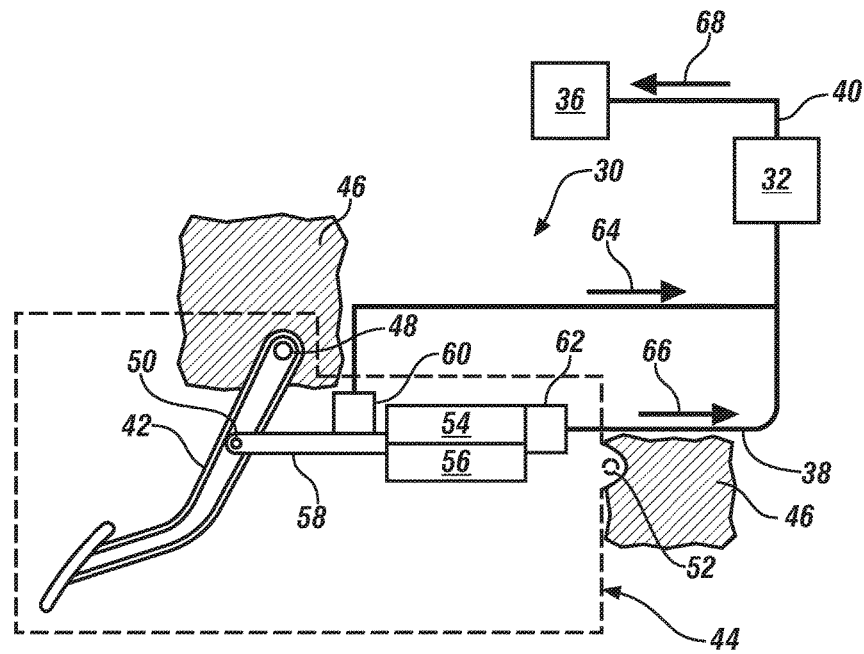
FIG. 2 is a schematic of the BBW system.

Referring to FIG. 2, the brake pedal assembly 30 may include a brake pedal 42 and a brake pedal emulator 44. The brake pedal 42 may be supported by, and in moving relationship too, a fixed structure 46. Illustrated as one non-limiting example, the brake pedal 42 may be pivotally engaged to the fixed structure 46 about a first pivot axis 48. The emulator 44 may be supported by and extends between the brake pedal 42 and the fixed structure 46. More specifically, the emulator 44 may be pivotally engaged to the brake pedal at a second pivot axis 50, and may be pivotally engaged to the fixed structure 46 at a third pivot axis 52. The second and third pivot axis 50, 52 may be spaced from the first pivot axis 48, and all three pivot axis 48, 50, 52 may be substantially parallel to one another.

The emulator 44 of the brake pedal assembly 30 is configured to simulate the behavior and/or 'feel' of a more traditional hydraulic braking system. The emulator 44 may include a damping device 54 and a force induction device 56 to at least simulate a desired or expected 'feel' of the brake pedal 42 during operation by the driver. The damping device 54 is constructed and arranged to generally produce a damping force that is a function of the speed upon which a driver depresses the brake pedal 42. The force induction device 56 produces an induced force (e.g., spring force) that is a function of brake pedal displacement. Both the damping device 54 and the force induction device 56 may be controlled, individually or in combination, by the controller 32 to at least simulate the desired pedal 'feel.'

Figure 3:
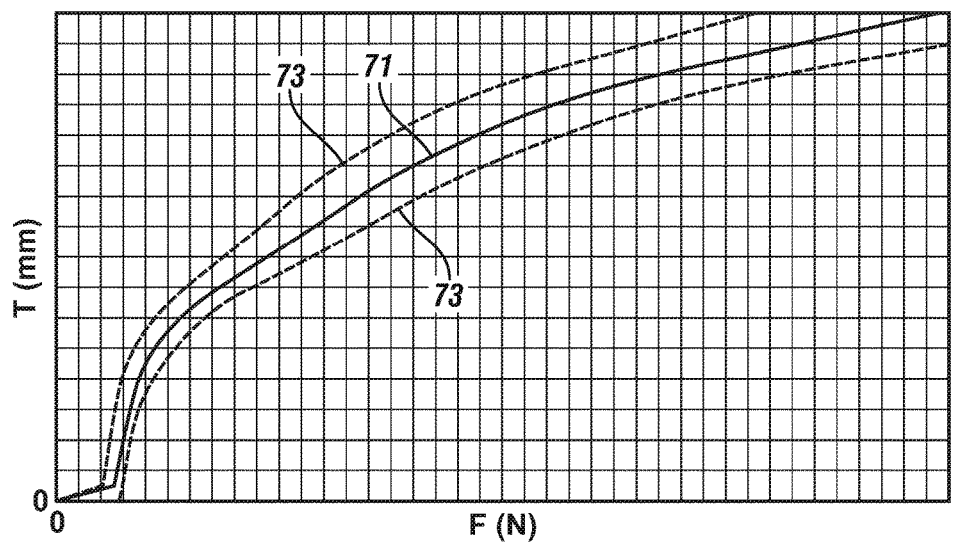
FIG. 3 is a graph of a force profile of a force induction device of the BBW system as a function of brake pedal travel.

Referring to FIG. 3, one example of a force profile of the force induction device 56 is generally illustrated as a function of brake pedal travel T, illustrated in the graph as driver applied brake pedal force F verse the brake pedal travel T. The solid arcuate or curved line 71 represents the targeted profile, and the dashed lines 73 represent the outer bounds (i.e., tolerance) of the targeted profile. The force induction device 56 may be designed to meet this targeted profile 71.

Figure 4:
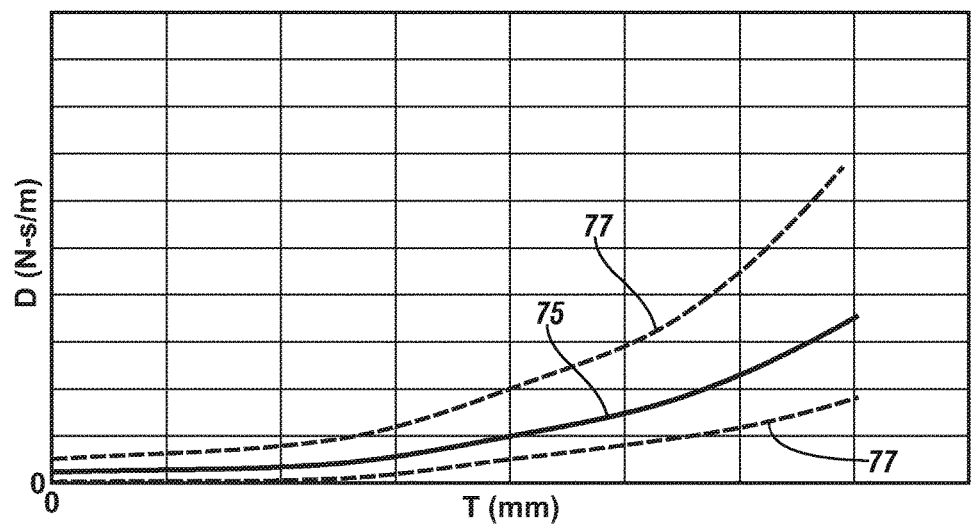
FIG. 4. is a graph of a damping coefficient profile of the BBW system.

Referring to FIG. 4, one example of a damping coefficient profile is generally illustrated as a function of brake pedal travel T, illustrated in the graph as the brake pedal travel T verse a damping coefficient D. The solid arcuate or curved line 75 represents the targeted profile, and the dashed lines 77 represent the outer bounds (i.e., tolerance) of the targeted profile. Similar to the force induction device 56, the damping device 54 may be designed to meet this targeted profile. It is contemplated and understood that the data from the targeted force and damping profiles along with pre-established target tolerances (i.e., bounds) may be programmed into the controller 32 for various processing functions. It is further contemplated and understood that to various degrees, the damping device 54 may be adjustable with this adjustability being controlled by the controller 32 to, for example, meet the pre-programmed profiles of FIGS. 3 and 4. Yet further, the damping coefficient curve of FIG. 4 may be one of a plurality of damping coefficient curves each associated with an aspect of vehicle modeling. It is further noted that the damping coefficient D is a function of pedal position, and the damping force is a function of pedal apply rate and pedal position.

Referring to FIG. 2, the emulator 44 may further include a linking member 58 that operatively connects the brake pedal 42 to the devices 54, 56 at the second pivot axis 50. A displacement sensor 60 of the emulator 44 is configured to measure displacement (e.g., linear or angular displacement) of at least one of the brake pedal 42 and the linking member 58. The emulator 44 may further include at least one pressure sensor 62 generally orientated at a reactive side of the devices 54, 56 (i.e., proximate to the third pivot axis 52) to measure applied pressure. It is contemplated and understood that the pressure sensor 62 may be a pressure transducer or other suitable pressure sensor configured or adapted to precisely detect, measure, or otherwise determine an applied pressure or force imparted to the brake pedal.

To improve system reliability, the emulator 44 may include more than one displacement sensor located at different locations of the brake pedal assembly 30. Similarly, the emulator 44 may include more than one pressure sensor (i.e., force) configured to, for example, output redundant signals to more than one controller to facilitate fault tolerance for sensor faults. In operation, the controller 32 is configured to receive a displacement signal (see arrow 64) and a pressure signal (see arrow 66) over pathway 38 and from the respective sensors 60, 62 as the brake pedal 42 is actuated by a driver. The controller 32 processes the displacement and pressure signals 64, 66 then sends appropriate command signal(s) 68 to the brake actuators 36 over the pathway 40.

Figure 5:
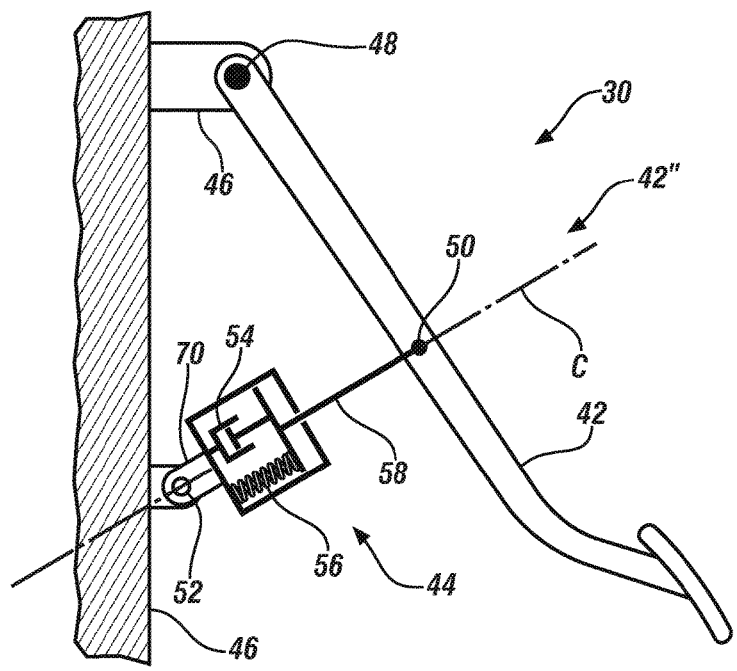
FIG. 5 is a schematic of a brake pedal assembly of the BBW system.

Referring to FIG. 5, the emulator 44 of the brake pedal assembly 30 may further include a base member 70 pivotally connected directly to the fixed structure 46 about pivot axis 52. The damping device 54 and the force induction device 56 may generally be located between and operatively bear upon the base member 70 and the linking member 58. In operation, as the brake pedal 42 is depressed by a driver, the linking member 58 is generally moved closer to the base member 70 and the devices 54, 56 are compressed therebetween, creating the desired brake pedal 'feel.'

One example of the force induction device 56 may be a resiliently compressible, coiled, spring (as illustrated) having opposite ends that bear upon the opposing members 58, 52. Other non-limiting examples of a force induction device 56 include an elastomeric foam, a wave spring, and any other device capable of producing a force generally as a function of brake pedal displacement. One example of the damping device 54 may include a hydraulic cylinder having at least one internal orifice for the flow and exchange of hydraulic fluid between chambers. Such a damping device and others may be designed to exert a constant force when a constant speed is applied to the brake pedal throughout the brake pedal throw. One example of such a 'constant force' damping device 54 may be a hydraulic cylinder with a single hole or opening. Another non-limiting example of a damping device 54 may include a device designed to increase a force with increasing pedal displacement and when the brake pedal 42 is depressed at a constant speed. Such 'variable force' damping devices may be passive and dependent solely upon the brake pedal position and/or displacement, or may be active and controllable by the controller 32. One example of a 'passive variable force' damping device may include a hydraulic cylinder with multiple openings individually exposed depending upon the brake pedal position. Other non-limiting examples of a damping device 54 may include a friction damper, and any other device capable of producing a force generally as a function of pedal actuation speed. Although illustrated in a parallel (i.e., side-by-side) relationship to one-another, it is further contemplated and understood that the orientation of the devices with respect to one-another may take any variety of forms. For example, the devices 54, 56 may be concentric to one-another about a common centerline C that may intersect pivot axis 50 and pivot axis 52.

Figure 6:
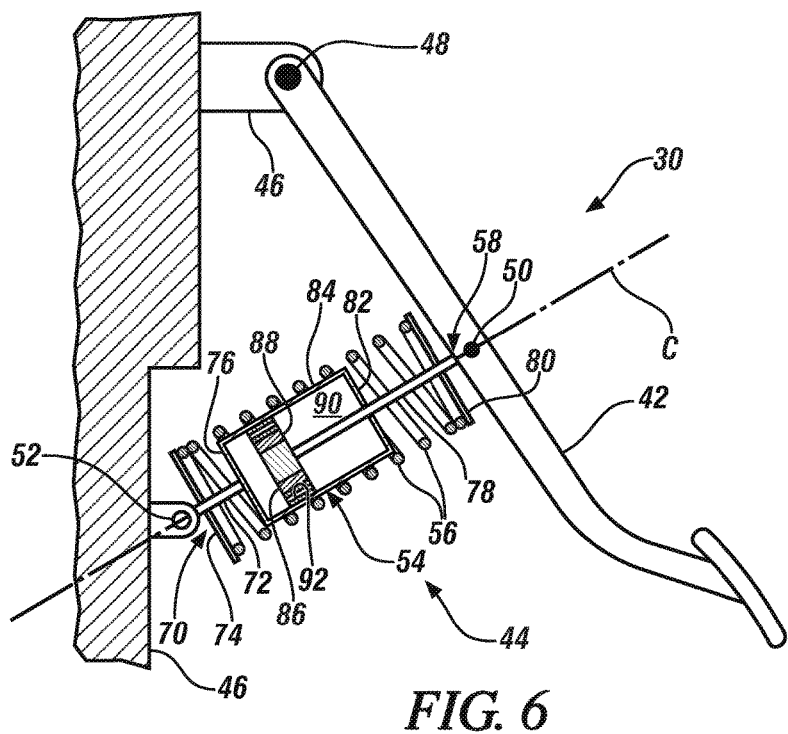
FIG. 6 is a schematic of another embodiment of the brake pedal assembly.

Referring to FIG. 6, one example of an emulator 44 is illustrated having an 'active variable force' damping device 54. In this embodiment, the force induction device 56 may be a coiled spring concentrically disposed about the damping device 54. The damping device 54 may be a hydraulic cylinder that may utilize a magneto-rheological or electro-rheological fluid to actively alter the damping force based on, for example, pedal position. Both devices may be configured to compress along the centerline C when the brake pedal 42 is depressed. The force induction device 56 may also facilitate the return of the brake pedal 42 upon pedal release by the driver. In this embodiment, the base member 70 may include a rod or linkage 72 and a stop 74. The linkage 72 may be pivotally engaged to the fixed structure 46 at one end, and is rigidly fixed to a bottom plate 76 of the damping device 54 at an opposite end. The stop 74 may be located axially between the pivot axis 52 and the bottom plate 76 of the damping device 54 with respect to centerline C, and may project radially outward from the linkage 72 for the seating of one end of the force induction device 56.

The linking member 58 of the emulator 44 may include a rod or linkage 78 and a stop 80 that is axially spaced from and opposes the stop 74 of the base member 70. A first end of the linkage 78 may be pivotally engaged to and projects axially outward from the brake pedal 42 at the pivot axis 50 and along the centerline C. The linkage 78 projects from the first end, sealably through a top plate 82 of the damping device 54, and to a proximal distal, opposite, second end. The stop 80 may be located axially between the pivot axis 50 and the top plate 82 of the damping device 54 with respect to centerline C, and may project radially outward from the linkage 78 for engagement and/or seating of an opposite end of the force induction device 56.

As previously stated, the damping device 54 may be a hydraulic cylinder that utilizes a magneto-rheological or electro-rheological fluid to actively alter the damping force based on, for example, pedal position. The damping device 54 may include a circumferentially continuous wall 84 that may be cylindrical, the bottom plate 76, the top plate 82, a hydraulic or piston head 86, and an electrical element 88 that may be a coil. The wall 84 may be located radially inward from the force induction device or coiled spring 56, and extends axially between the bottom and top plates 76, 82. The wall 84 combined with the bottom and top plates 76, 82 generally define the boundaries of a hydraulic chamber 90 filled with the hydraulic fluid. The piston head 86 is located in the chamber 90 and may be engaged to a proximal distal end of the linkage 78 of the linking member 58. The wall 84 carries a circumferentially continuous surface that faces radially inward and is in sealing contact with the piston head 86.

In operation, as the brake pedal 42 is actuated, the piston head 86 (via the linkage 78) reciprocates within the chamber 90. The chamber 90 is generally divided into two separate cavities by the piston head 86 that change in volume as the piston head reciprocates. The damping device 54 further includes an orifice 92 in fluid communication between the cavities. In one example, the orifice 92 may be defined by and communicates through the piston head 86. As the piston head 86 moves within the chamber 90, one cavity becomes larger as the other cavity becomes smaller. With the changing volumes between the cavities, the hydraulic fluid flows through the orifice 92 and into the cavity that is enlarging. The resistance to fluid flow through the orifice 92 generally produces the damping force of the damping device 54.

The resistance to fluid flow through the orifice 92 is dependent, at least in-part, upon the viscosity of the hydraulic fluid. The lower the viscosity, the lower is the damping coefficient, or damping force at a constant flow rate. In the present embodiment, the fluid viscosity may be altered, during any given moment in time, to vary the damping force. To facilitate this active damping force control, the electrical element 88 of the damping device 54 may be electrically energized via a command/control signal from the controller 32. When energized, the electrical element 88 may produce a magnetic field that alters molecules of the hydraulic fluid thereby increasing viscosity. In one example, the electrical element 88 may be mounted to the head 86 in close proximity to the orifice 92. The element 88 may be energized via a hard wired conductive path to, for example, a battery and/or the controller 32, or may be energized via a wireless power transfer arrangement (i.e., induction).

Figure 7:
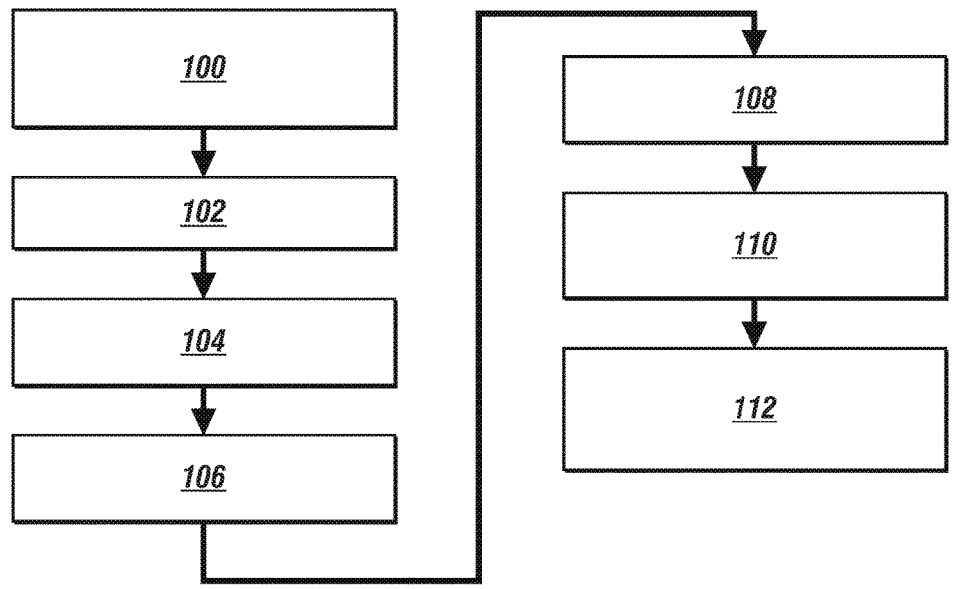
FIG. 7 is a flow chart of a method of operating the BBW system.

Referring to FIG. 7, a method of operating the BBW system 26 may include a first block 100 that entails pre-loading target data (see FIG. 4) relative to a damping force coefficient value as a function of brake pedal travel into the computer readable and writeable storage medium of the computer-based controller 32. At block 102, the brake pedal 42 may be actuated by a driver. Block 104 entails sending a brake pedal position signal 64 (see FIG. 2) to the controller 32 from a displacement sensor 60. In block 106, the controller 32 processes the brake pedal position signal utilizing the target data. At block 108, the controller 32 outputs a command signal based on the brake pedal position and target data. In block 110 and as a result of the command signal, the electric coil 88 (see FIG. 6) is energized which alters the viscosity of the hydraulic fluid based on brake pedal position. In block 112, a reactive damping force is exerted against the brake pedal 42 during brake pedal actuation, and that varies with varying viscosity based on brake pedal position.

Advantages and benefits of the present disclosure include the use of electric current to control the viscosity of electro/magneto rheological fluid (i.e., magneto-rheological or electro-rheological fluid) within a damping device (e.g., hydraulic cylinder forcing fluid through an orifice) in order to provide pedal damping similar to that of a more traditional brake system. Other advantages may include a simulated brake pedal stiffness, damping and hysteresis similar to that of a vacuum boosted system. Yet another advantage includes a braking system capable of controlling brake pedal damping in real time, and a damping device that not only controls the magnitude of a damping force as a function of pedal speed, but may also control the damping force (i.e., damping coefficient) as a function of brake pedal travel to match a desired damping coefficient curve.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A brake pedal emulator extending and connected between a support structure and a brake pedal operatively engaged to the support structure, the brake pedal emulator comprising:
   a hydraulic cylinder including a magneto-rheological hydraulic fluid and an electrical element configured to carry an electrical current for controlling a viscosity of the magneto-rheological hydraulic fluid and thereby control a first force exerted by the hydraulic cylinder when actuated;
   a coiled spring engaged between the support structure and the brake pedal, and concentrically disposed about the hydraulic cylinder, wherein the coiled spring is constructed and arranged to exert a second force upon the brake pedal that varies as a function of brake pedal travel, wherein the coiled spring and the hydraulic cylinder are compressible along a common centerline;
   a base member directly engaged pivotally to the support structure at a first pivot axis and rigidly engaged to the hydraulic cylinder; and
   a linking member directly engaged pivotally to the brake pedal at a second pivot axis and directly engaged to a reciprocating head of the hydraulic cylinder, and wherein the coiled spring is seated between the base member and the linking member for compression as the brake pedal is actuated.

2. The brake pedal emulator set forth in claim 1, wherein the coiled spring is in contact with and extends axially between a first stop of the base member and a second stop of the linking member.

3. A brake pedal emulator extending and connected between a support structure and a brake pedal operatively engaged to the support structure, the brake pedal emulator comprising:
   a hydraulic cylinder including a circumferentially continuous wall defining at least in-part a chamber, a piston head disposed in the chamber and adapted to reciprocate along an axis; a linkage directly attached to the piston head at a first end and pivotally engaged to the brake pedal at an opposite second end; a magneto-rheological hydraulic fluid, an electrical element configured to carry an electrical current for controlling a viscosity of the magneto-rheological hydraulic fluid and thereby control a first force exerted by the hydraulic cylinder when actuated; and
   a coiled spring compressed between the circumferentially continuous wall and the linkage, wherein the coiled spring is adapted to bias the linkage out of the chamber.

4. The brake pedal emulator set forth in claim 3, wherein the piston head defines an orifice for the flow of the magneto-rheological hydraulic fluid as the piston head reciprocates.

* * * * *